United States Patent [19]

Stranford et al.

[11] Patent Number: 5,354,602
[45] Date of Patent: * Oct. 11, 1994

[54] REINFORCED SILICON CARBOXIDE COMPOSITE WITH BORON NITRIDE COATED CERAMIC FIBERS

[75] Inventors: Gerald T. Stranford, Palatine; Roger Y. Leung, Schaumburg; Stephen T. Gonczy, Prospect, all of Ill.

[73] Assignee: Allied-Signal Inc., Morris Township, Morris County, N.J.

[ * ] Notice: The portion of the term of this patent subsequent to Jan. 21, 2010 has been disclaimed.

[21] Appl. No.: 7,037

[22] Filed: Jan. 21, 1993

Related U.S. Application Data

[63] Continuation of Ser. No. 654,168, Feb. 12, 1991, abandoned.

[51] Int. Cl.$^5$ .......... D03D 3/00; D04H 3/00; C04B 35/02; C03C 3/00
[52] U.S. Cl. .................. 428/220; 428/245; 428/288; 428/294; 428/378; 428/408; 428/902; 501/11; 501/95
[58] Field of Search .............. 501/4, 11, 12, 32, 90, 501/95; 428/902, 408, 294, 378, 288, 245, 229

[56] References Cited

U.S. PATENT DOCUMENTS

| | | | |
|---|---|---|---|
| Re. 32,107 | 4/1986 | January | 501/12 |
| 3,944,519 | 3/1976 | Mink et al. | 260/46.5 |
| 4,234,713 | 11/1980 | LeGrow | 528/15 |
| 4,297,139 | 10/1981 | Beall et al. | 501/4 |
| 4,460,638 | 7/1984 | Haluska | 428/234 |
| 4,460,639 | 7/1984 | Chi et al. | 428/224 |
| 4,460,640 | 7/1984 | Chi et al. | 428/224 |
| 4,642,271 | 2/1987 | Rice | 428/698 |
| 4,885,199 | 12/1989 | Corbin et al. | 501/95 |
| 4,900,779 | 2/1990 | Leibfried | 528/15 |
| 4,906,763 | 3/1990 | Paciorek et al. | 556/403 |
| 4,915,760 | 4/1990 | Singh et al. | 156/89 |
| 4,948,662 | 8/1990 | Simpson et al. | 428/290 |
| 4,981,820 | 1/1991 | Renlund et al. | 501/39 |
| 5,032,551 | 7/1991 | Tashiro et al. | 501/95 |
| 5,039,635 | 8/1991 | Stempin et al. | 501/32 |
| 5,180,694 | 1/1993 | Renlund et al. | 501/12 |
| 5,242,866 | 9/1993 | Leung et al. | 501/12 |

OTHER PUBLICATIONS

Prewo et al. "Hber Reinforced Glasses and Glass-Ceramics for High Performance Applications" *Ceramic Bulletin*, vo. 65, No. 2 (1986).

*Primary Examiner*—George F. Lesmes
*Assistant Examiner*—James D. Withers
*Attorney, Agent, or Firm*—Harold N. Wells; Gerhard H. Fuchs; Gerard P. Rooney

[57] ABSTRACT

An improved fiber reinforced glass composite includes a boron nitride-coated refractory fiber in a matrix of a black glass ceramic having the empirical formula $SiC_xO_y$ where x ranges from about 0.9 to 1.6 and y ranges from about 0.7 to 1.8. Preferably the black glass ceramic is derived from cyclosiloxane monomers containing a vinyl group attached to silicon and/or a hydride-silicon group. Graceful failure can be obtained after exposure of the composites to temperatures up to 600°–700° C. in air.

13 Claims, No Drawings

REINFORCED SILICON CARBOXIDE COMPOSITE WITH BORON NITRIDE COATED CERAMIC FIBERS

This application is a continuation of application Ser. No. 07/654,168 filed Feb. 12, 1991, now abandoned.

The invention relates generally to composite laminates in which a matrix material is reinforced with fibers. Laminates with a polymer matrix are widely used for various purposes, but they are not generally applicable in situations where temperatures are expected to be above about 300° C. The present invention relates to ceramic fiber reinforced-glass matrix composites having application at temperatures which would destroy conventional polymeric materials.

Matrices have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 07/002,049, now U.S. Pat. No. 5,242,866, a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and. y ranges from 0.7–1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of such black glass to reinforcing fibers to form laminates very useful in high temperature applications.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed, and since they release alcohols and contain excess water, they must be carefully dried to avoid fissures in the curing process.

Another U.S. Pat. No. 4,460,640, disclosed related fiber reinforced glass composites using organopolysiloxane resins of U.S. Pat. No. 3,944,519 and U.S. Pat. No. 4,234,713 which employ crosslinking by the reaction of $\equiv$SiH groups to $CH_2\!=\!CHSi\equiv$ groups. These later two patents have in common the use of organosilsesquioxanes having $C_6H_5SiO_{3/2}$ units, which have been considered necessary by the patentees to achieve a flowable resin capable of forming a laminate. A disadvantage of such $C_6H_5SiO_{3/2}$ units is their tendency to produce free carbon when pyrolyzed. The present invention requires no such $C_6H_5SiO_{3/2}$ units and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. The present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over cured. The present invention can be carried out after coating the fibers and requires no pre-curing step.

In co-pending patent application Ser. No. 07/426,820 composites of refractory fibers with a black glass matrix were disclosed. Such composites have good physical properties but tend to exhibit brittle fracture with little evidence of fiber pullout. The composites reported in U.S. Pat Nos. 4,460,639 and 4,460,640 also exhibit brittle fracture with a flexural strength of less than 308 MPa.

Ceramic matrix composites which combine whiskers, particulates, staples, or continuous fibers with ceramic matrix offer a potential to overcome the catastrophic brittle failure inherent to monolithic ceramics. Among these reinforcement types, continuous fiber is the most effective means known for toughening ceramics. If brittle fracture is replaced by the graceful fibrous fracture, ceramic composites may be used reliably as an engineering material for structural and other high performance applications.

The type of failure is to large extent determined by the nature of the interface between the reinforcement fiber and the surrounding matrix. In ceramic composites, high toughness results when energy is absorbed as fibers pull out from the matrix as the composite cracks. Thus, a low interfacial stress or friction is needed to ensure fibrous fracture. If a strong interfacial bond exists, the crack will cut through the fiber without pulling out the fiber, resulting in a fracture behavior not much different from unreinforced monolithic ceramics. In co-pending U.S. Patent applications 07/464,470 and 07/523,620 the use of a carbon interface in a silicon carboxide "black glass" matrix was shown to produce a composite having a high strain-to-failure and exhibiting fibrous fracture. Our present invention relates to the use of boron nitride interface in a silicon carboxide black glass matrix, which also produces a composite having improved strength at temperatures higher than those in which a carbon interfacial layer is useful.

Boron nitride coatings have been used for providing toughness to fiber-reinforced ceramic composites. Illustrative are U.S. Pat. Nos. 4,642,271, 4,948,662, 4,906,763, and 4,915,760. Various methods of applying boron nitride coatings to the individual fibers are disclosed. Chemical vapor deposition using borazine or borazine compounds appear to be favored, but other reactions have been suggested such as reacting boron oxide with ammonia or boron trichloride with ammonia. Boron nitride coated fibers have been incorporated into a variety of matrices, including silicon carbide, zironia, cordierite, and silicon nitride.

SUMMARY OF THE INVENTION

An improved fiber reinforced glass composite of the invention comprises (a) at least one boron nitride-coated refractory fiber selected from the group consisting of boron, silicon carbide, graphite, silica, quartz, S-glass, E-glass, alumina, aluminosilicate, boron nitride, silicon nitride, boron carbide, titanium boride, titanium carbide, zirconium oxide, zirconia-toughened alumina, silicon carbonitride, and silicon oxycarbonitride and, (b) a carbon-containing black glass ceramic composition having the empirical formula SiCxOy where x ranges from about 0.5 to about 2.0, preferably from 0.9 to 1.6, and y ranges from about 0.5 to about 3.0, preferably from 0.7 to 1.8.

In a preferred embodiment, the black glass ceramic composition (b) of the invention is the pyrolyzed reaction product of a polymer prepared from (1) a cyclosiloxane monomer having the formula

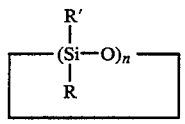

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst. The polymer product is pyrolyzed, preferably in a non-oxidizing atmosphere, to a temperature in the range of about 800° C. to about 1400° C. to produce the black glass ceramic.

In another embodiment the invention comprises a method of preparing a fiber reinforced glass composite wherein the cyclosiloxane reaction product described above is combined with boron nitride-coated refractory fibers which may be in the form of woven fabric or unidirectionally aligned fibers. Plies of the coated fibers may be laid-up to form a green laminate and thereafter pyrolyzed in a non-oxidizing atmosphere at a temperature between about 800° C. and about 1400° C., preferably about 850° C., to form the black glass composite. The laminate may be reimpregnated with polymer solution and repyrolyzed in order to increase density. Alternatively, a resin transfer technique may be used in which fibers having a boron nitride coating are placed in a mold and the black glass matrix precursor is added to fill the mold before curing to form a green molded product.

The refractory fibers are coated with a boron nitride layer about 10 to 5000 nm thick prior to fabrication and pyrolysis of the cyclosiloxanes to form the black glass matrix. Preferred methods of forming such boron nitride coatings are chemical vapor deposition, coating with boron containing precursors followed by nitridation with $N_2$ or $NH_3$, coating with polymer precursors followed by pyrolysis, or coating with boron nitride powder.

These uniaxial fiber reinforced black glass composites show flexural strength greater than about 440 MPa at room temperature and fibrous, graceful fracture at temperatures up to about 700° C. A three-fold increase in flexural strength and a four-fold increase in strain at maximum stress has been obtained as compared with black glass composites without a boron nitride interfacial coating.

DESCRIPTION OF THE PREFERRED EMBODIMENTS

Black Glass Ceramic

The black glass ceramic used as the matrix has an empirical formula SiCxOy wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis in a non-oxidizing atmosphere at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of platinum as a hydrosilylation catalyst for a time in the range of from about 1 minute to about 600 minutes. When the polymer is placed in a non-oxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane will contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

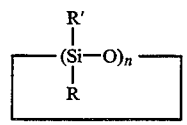

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7 -tetrahydrocyclotetrasiloxane. Such monomers may also contain alkyl groups such as for example, 1,3-divinyl-1,5-dihydro-3,5,7,7tetramethylcyclosiloxane. Alternatively, two or more cyclosiloxane monomers may be polymerized. Such monomers would contain either a silicon hydride bond or a silicon-vinyl bond or both and the ratio of the two types of bonds should be about 1:1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3-divinyl-1,5-dihydro-3,5,7,7-tetramethylcyclotetrasiloxane,
1,3,5-trivinyl-1,3,5,7,7-pentamethylcyclotetrasiloxane,
1,3,5-trihydro-1,3,5,7,7-pentamethylcyclotetrasiloxane,
1,3,5,7,9,11,13,15,17,19,21,23,25,27,29-pentadecavinyl-1,3,5,7,9,11,13,15,17,19,-21,23,25,27,29-pentadecahydrocyclopentadecasiloxane 1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

A small amount of linear siloxane polymers containing hydro and vinyl groups, say less than 10%, may be present without seriously affecting the properties of the black glass product.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent. Resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and is in consistent resin very critical composite fabrication.

Fibers

Reinforcing fibers useful in the composites of the invention are refractory fibers used for applications where superior physical properties are needed. They include such materials as boron, silicon carbide, graphite, silica, quartz, S-glass, E-glass, alumina, aluminosilicates, boron nitride, silicon nitride, boron carbide, titanium boride, titanium carbide, zirconium oxide, and zirconia-toughened alumina, silicon carbonitride, and silicon oxycarbonitride.

The fibers may have various sizes and forms. They may be monofilaments from 1 $\mu$m to 200 $\mu$m diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, where improved tensile strength at high temperatures is desired, the fibers are provided with a boron nitride coating which reduces the bonding between the fibers and the black glass matrix. The surface sizings found on fibers as received or produced may be removed by solvent washing or heat treatment and the boron nitride coating applied. Various methods may be used, including chemical vapor deposition, coating with boron-containing precursors followed by nitridation with $N_2$ or $NH_3$, coating with polymer precursors followed by pyrolysis, or coating with boron nitride powder. One preferred technique is chemical vapor deposition using $BF_3$ and $NH_3$, $B_2H_6$ and $NH_3$, $B_2H_6$ and $NH_3$ and $H_2$, $BCl_3$ and $NH_3$, $BCl_3$ and $NH_3$ and $H_2$, $B_3N_3H_6$, $Cl_3B_3N_3H_3$, $B_{10}H_4$ and $NH_3$, $(C_2H_5)_3NBH_3$, or $(C_2H_5)_2NH \cdot BH_3$. Another method is to coat the fiber with a polymer formed by reacting chloroborazine with hexamethyldisilazane followed by nitridation with $NH_3$ as disclosed in U.S. Pat. No. 4,906,763. The thickness of such boron nitride coatings preferably will be about 10 to 5000 nm, although larger or smaller amounts could be used if the strength of the resulting composite is satisfactory.

In co-pending, application Ser. Nos. 07/464,470 and 07/523,620 it is shown that coating reinforcing fibers with carbon provides an interfacial bond between the fibers and the matrix which induces graceful failure under stress and fibrous fracture. However, the carbon interface becomes unstable in an oxidizing atmosphere at above about 400° C. as oxidation of the carbon takes place. The boron nitride coating of the present invention is stable up to about 600°–700° C. where a carbon interfacial coating is not useful for continuous exposure.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with boron nitride-coated reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating could be done by dipping, spraying, brushing, or the like. In still another embodiment, the resin transfer technique can be employed in which the reinforcing fibers are placed in a mold and then the black glass precursor is added to fill the mold before curing to form a green molded product.

In one method, a continuous fiber is coated with a solution of the black glass precursor polymer and then wound on a rotating drum covered with a release film which is easily separated from the coated fibers. After sufficient fiber has been built up on the drum, the process is stopped and the uni-directional fiber mat removed from the drum and dried. The resulting mat (i.e., "prepreg") then may be cut and laminated into the desired shapes. Alternatively, many continuous fibers may be coated, aligned in parallel, and then passed through an oven to form a continuous reinforced tape coated with black glass precursor.

In a second method, a woven or pressed fabric of the reinforcing fibers is infiltrated with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In resin transfer molding a mold with the required shape is filled with the desired reinforcement material. The reinforcement could be a preform having a 3-dimensional weave of fibers, a lay-up of fabric plies, a non-woven mat of chopped staple or bundled tows, or assemblies of whiskers, and such others as are familiar to those skilled in the art. The reinforcement material would be coated with the boron nitride to insure a weak bond between matrix and reinforcement in the final composite where improved tensile strength is desired. The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity i.e. <50 cp (MPA·s) of the neat monomer solution is exceptionally well suited for resin impregnation of thick wall and complex shape components. A neat liquid of intermediate viscosity between about 50–1000 cp (MPa·s) may also be used for impregnation of thin wall and hollow parts, such as tube, cylinder, honeycomb, and fin structures. This intermediate viscosity liquid may be produced by controlled partial polymerization of the monomers.

The filled mold "is then heated to about 30° C.–150° C. for about ½–30 hours as required to cure the monomer solutions to a polymerized state. The specific cure cycle is tailored for the geometry and desired state of cure. For example, thicker wall sections require slower cures to prevent uneven curing and exothermic heat build-up. The cure cycle is tailored through control of the amount of catalyst added and the time-temperature cycle. External pressure may be used during the heating cycle as desired.

When the component is fully cured, it is removed from the mold. In this condition it is in a state equivalent to the composite made by lamination and autoclaving of prepreg plies. Further processing consists of the equivalent pyrolysis and impregnation cycles to be described for the laminated components.

Solvents for the black glass precursor polymers include hydrocarbons, such as octane, hexane, toluene, benzene, and xylene, and ethers, such as tetrahydrofuran, and halogenated compounds such as chloroform and carbon tetrachloride. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles 0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. Our resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. in an inert atmosphere (pyrolysis) converts the polymer into a black glass ceramic containing essentially only carbon, silicon, and oxygen. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out by heating to the maximum temperature selected, holding at that temperature for a period of time determined by the size of the structure, and then cooling to room temperature. Little bulk shrinkage is observed for the black glass composites and the resulting structure typically has about 70-80% of its theoretical density.

Conversion of the polymer to black glass takes place between 430° C. and 950° C. Three major pyrolysis steps were identified by thermogravimetric analysis at 430° C.-700° C., 680° C.-800° C. and 780° C.-950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.-120° C. for a sufficient period of time. Following gelation, the polymer is pyrolyzed as described above. Repeating these steps, it is feasible to increase the density up to about 95% of the theoretical.

It has been shown in co-pending applications 7/464,470 and 07/523,620 that the high temperature strength of composites can be substantially improved by continued impregnation of the composite with black glass solutions, which is believed to seal off micropores in the black glass coating making it possible to defend the coating on the fibers against destructive oxidation.

The examples below illustrate the improved resistance to high temperatures obtained by applying a boron nitride coating to the refractory fibers prior to contacting them with the black glass precursors.

EXAMPLE 1

Polymer Precursor Preparation

The cyclosiloxane having a silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A mixture of 59 vol. % ViSi/41 vol. % HSi was mixed with 0.6 vol. % of a platinum-cyclovinylmethylsiloxane complex having 0.6 wt. % pt. The mixture was diluted with isooctane to give a 10 vol. % solution of the cyclosiloxane monomers. The solution was heated to reflux conditions (100° C.) and refluxed for about 70 minutes. Then, the solution was concentrated in a rotary evaporator at 50° C. to a concentration suitable for use in prepregging. The resin produced was poly(methylmethylenecyclosiloxane) (PMMCS). It was tacky at room temperature, but it was flowable at temperatures of about 70° C. or higher and thus suitable for use as a B-stage resin.

EXAMPLE 2

Preparation of Test Specimens

A 40 wt. % poly(methylmethylenecyclosiloxane) (PMMCS) solution in isooctane was used for making a prepreg. Boron nitride coated continuous ceramic grade Nicalon ® tow containing about 500 monofilaments (a silicon carbide fiber supplied by Dow-Corning) was impregnated with the PMMCS resin by passing the tow through the resin solution. The boron nitride coating had been applied by chemical vapor deposition using the reaction of $BCl_3$ with ammonia and was 100 to 150 nm thick for samples designated "A" or 350 to 400 nm thick for samples designated "B". The impregnated tow was formed into a prepreg by laying up the tow on a rotating drum. The prepreg contained 45.6 by weight of PMMCS and 54.4% by weight fiber. The fiber areal weight, which is defined as the weight of fiber per unit area in the prepreg, was 402 gm/m².

6"×5" (152.4 mm×127 mm) plies were cut from the prepreg for A samples and 3.25"×3.25" (82.6 mm×82.6 mm) for B samples. Five plies were laid-up unidirectionally to form a laminate. This [0]₅ laminate was placed in a vacuum bag and consolidated in an autoclave using the following procedure:

1. debulking at 65° C. for ½ hour under vacuum,
2. heating up to 150° C. at 100 psig (689.7 kPa gauge) nitrogen pressure over 1 hour, and holding at 150° C. for 15 minutes,
3. cooling to 70° C. while maintaining the pressure,
4. releasing the pressure and free cooling to room temperature.

The resin flowed and solidified during the autoclave curing. Loss of the resin through bleeding was estimated to be less than 2% with respect to the total weight of the laminate.

The consolidated green laminate was then machine cut into 0.25"×3" (6.4 mm×76.2 mm) test bars with average thickness of 0.047" (1.20 mm). The green test bars were then pyrolyzed in flowing nitrogen (flowrate=ca. 500 cubic cm per minute) to convert the PMMCS into black glass matrix composites using the following heating program:

1. heat to 480° C. at 2° C./min,
2. hold at 480° C. for 2 hours,
3. heat from 480° C. to 900° C. at 1.5° C./min,
4. cool to room temperature at 3.5° C./min.

The density of the as-pyrolyzed test bars was 1.5 gm/cc with a char yield of 92.7%. The test bars were then infiltrated with the neat monomer liquid without solvent. After gelling the sol at 55° C., the infiltrated bars were then pyrolyzed by heating in nitrogen atmosphere at 90° C./hr to 900° C., held for 0.5 hrs. and then cooled to room temperature at 300° C./min. A total of five impregnations were used to increase the density of the composite to about 1.99 gm/cc. Bars impregnated five times contained 51% Nicalon ® fiber by volume. Open porosity was estimated to be about 10%. The fully-impregnated test bars were oxidized in air at temperatures between 500° and 831° C. and then cooled to room temperature for strength testing.

EXAMPLE 3

Testing for Flexural Strength

Three-point bend tests were performed on the boron nitride-coated Nicalon ® reinforced black glass bars prepared in Example 2 using an Instron universal testing machine. The span of the fixture was 2.75 inches (69.9 mm) and the cross-head speed was 0.05 cm/min. Flexural strengths for increasing oxidation temperatures are summarized below.

| Sample A (100–150 nm coating) | | | |
|---|---|---|---|
| Oxidation Treatment | Density, g/cc | Strength MPa | Strain, % |
| as prepared | 1.99 | 203 | 0.24 |
| 500° C./16 hrs | 2.11 | 291 | 0.31 |
| 575° C./16 hrs | 2.07 | 253 | 0.32 |
| 600° C./16 hrs | 2.02 | 175 | 0.26 |
| 600° C./60 hrs | 2.06 | 273 | 0.38 |
| 700° C./16 hrs | 2.14 | 203 | 0.26 |

These Sample A composites exhibited linear stress-strain curves and fractured into two pieces, although some fiber pullout was observed at the fracture surface. The data suggest that thermal treatment between about 500° and 600° C. improved the mechanical properties. The relatively low strength measured at 600° C. after 16 hours exposure does not appear consistent with the remainder of the data.

| Sample B (350–400 nm coating) | | | |
|---|---|---|---|
| Oxidation Treatment | Density, g/cc | Strength MPa | Strain, % |
| as prepared | 1.99 | >441 | >0.56 |
| 600° C./16 hrs | 1.94 | 486 | 0.80 |
| 600° C./60 hrs | 1.95 | 470 | 0.82 |
| 700° C./16 hrs | 1.96 | 236 | 0.44 |
| 800° C./16 hrs | 1.92 | 167 | 0.24 |

Comparison of the results for Samples A and B indicate that the thicker coating of boron nitride provides improved strength. The "as prepared" Sample B specimens exhibited shear failure, which indicated weak interfacial bonding between the fibers and the black glass matrix. Extensive fiber pullout was evident for the samples exposed to 600° C. for 16 hrs and 60 hrs. The samples exposed to 800° C. were weaker and less extensive fiber pullout was observed. It can be concluded that the boron nitride coating is stable in air up to about 600°–700° C. A carbon coated Nicalon ®—black glass composite was shown in co-pending application Ser. No. 07/464,470 and 07/523,620 to have a flexure strength of 324 MPa after 60 hrs at 450° C. in air. This contrasts with the boron nitride coated Nicalon ®—black glass composite as shown above to have 470 MPa flexure strength after 60 hrs at 600° C. in air.

EXAMPLE 4

Comparative

Nicalon ® fibers without a boron nitride coating were used to prepare SiC fiber reinforced black glass composites using a procedure similar to that described in Example 2. Test bars that were 4 inches by 0.5 inches by 0.065 inches (101.5 mm×12.7 mm×1.65 mm) were impregnated and pyrolyzed five times to a density of 2.13 g/cc. These bars were tested in four point bending mode using lower spans of 2 and 3 inches (50.8 mm and 76.2 mm) with upper spans of 1 and 1.5 inches (25.4 mm and 38.1 mm), respectively. The mean bend strength was 144.8 MPa with a strain at maximum stress of 0.14%. All samples exhibited brittle failure. This example demonstrates the importance of boron nitride coatings on the increase in strength and strain at maximum stress for the black glass matrix composites. The 350–400 nm boron nitride coating thus improved the flexure strength three times and the strain at maximum stress four times compared to the composites without a boron nitride interfacial coating.

EXAMPLE 5

Boron nitride coated Nextel 480 an alumina-silica-boria fiber from fibers were used in a manner similar to Example 2 to make black glass matrix composites with unidirectional fiber reinforcement. The boron nitride coating was about 200 nm thick and had been deposited by chemical vapor deposition but contained 10–20% carbon. Three-point bend tests were carried out in a manner similar to Example 3. The results of as-prepared and oxidized samples are given in the following table.

| Oxidation Treatment | Strength, MPa | Strain, % | Type of Failure |
|---|---|---|---|
| As-prepared | 210 | 0.29% | fibrous |
| 600° C./16 hr | 183 | 0.25% | fibrous |
| 800° C./16 hr | 117 | 0.14% | brittle |

The strength of the sample exposed to 800° C. for 16 hrs in air was reduced and it exhibited brittle failure, indicating that the boron nitride coating is useful up to 600° C., but may not be relied on to provide the desirable fibrous fracture when the temperature is increased above 600° C., at least with the thickness and method of deposition used in this example.

We claim:

1. A fiber reinforced glass composite consisting essentially of
   (a) refractory fibers having a boron nitride coating about 10 to 5000 nm thick;
   (b) a carbon-containing black glass ceramic composition having the empirical formula SiCxOy wherein x ranges from about 0.9 to about 1.6 and y ranges from about 0.7 to about 1.8 and wherein said black glass ceramic composition is the pyrolyzed reaction product of
   (1) a cyclosiloxane monomer having the formula

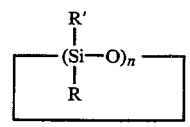

where n is an integer from 3 to 30, R is hydrogen, and R' is an alkene of from 2 to 20 carbon atoms in which one vinyl carbon atom is directly bonded to silicon or
   (2) two or more different cyclosiloxane monomers having the formula of ( 1 ) where for at least one monomer R is hydrogen and R' is an alkyl group having from 1 to 20 carbon atoms and for the other monomers R is an alkene from 2 to about 20 carbon atoms in which one vinyl carbon is directly bonded to silicon and R' is an alkyl group of from 1 to about 20 carbon atoms or
   (3) cyclosiloxane monomers having the formula of (1) where R and R' are moieties indepen.dently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

2. The composite of claim 1 wherein said boron nitride coating is deposited by chemical vapor deposition.

3. The composite of claim 2 wherein said boron nitride coating is deposited by reacting $BCl_3$ with ammonia.

4. The fiber reinforced glass composite of claim 1 wherein the refractory fibers are at least one of said fibers selected from the group consisting of boron, silicon carbide, graphite, silica, quartz, S-glass, E-glass, alumina, aluminosilicate, boron nitride, silicon nitride, boron carbide, titanium boride, titanium carbide, zirconium oxide, zirconia-toughened alumina, silicon carbonitride, and silicon oxycarbonitride.

5. The fiber reinforced glass composite of claim 4 wherein said refractory fibers are silicon carbide.

6. The fiber reinforced glass composite of claim 4 wherein said refractory fibers are graphite.

7. The fiber reinforced glass composite of claim 4 wherein said refractory fibers are alumina silica-boria.

8. The fiber reinforced glass composite of claim 4 wherein said refractory fibers are zirconia-toughened alumina.

9. The fiber reinforced glass composite of claim 4 wherein said refractory fibers are silica.

10. The fiber reinforced glass composite of claim 4 wherein said refractory fibers are alumina.

11. The fiber reinforced glass composite of claim 4 wherein said black glass ceramic composition is the pyrolyzed reaction product of poly(vinylmethylcyclosiloxane) and poly(methylhydrocyclosiloxane).

12. The fiber reinforced glass composite of claim 11 wherein said poly(vinylmethylcyclo siloxane) and poly(methylhydrocyclosiloxane) are the tetramers.

13. The fiber reinforced glass composite of claim 4 where the hydrosilylation catalyst is platinum.

* * * * *

UNITED STATES PATENT AND TRADEMARK OFFICE
CERTIFICATE OF CORRECTION

PATENT NO.   : 5,354,602
DATED        : October 11, 1994
INVENTOR(S)  : Gerald T. Stranford et al.

It is certified that error appears in the above-identified patent and that said Letters Patent is hereby corrected as shown below:

Title page, Column 1: "[Notice] The portion of the term of this patent subsequent to Jan. 21, 2010 has been disclaimed" should read:
--[Notice] The portion of the term of this patent subsequent to September 7, 2010 has been disclaimed--

Column 5, line 7: insert "-" after --7-- and before --tetramethylcyclosiloxane--

Column 6, line 8: "handleable and is in consistent resin very critical composite fabrication" should read
--handleable and consistent resin is very critical in composite fabrication--

Column 12, line 10: insert "(" after --480--

Column 12, line 11: insert "3M)" after --fiber from--

Column 12, line 66: "indepen.dently" should read --independently--

Column 13, line 14: before "boron" insert --alumina-silica-boria--

Column 14, line 18: delete "the" before --tetramers

Signed and Sealed this

Tenth Day of January, 1995

BRUCE LEHMAN

*Attest:*

*Attesting Officer*           *Commissioner of Patents and Trademarks*